(12) United States Patent
Hayes et al.

(10) Patent No.: US 11,203,194 B2
(45) Date of Patent: Dec. 21, 2021

(54) FIRE RESISTANT COMPOSITE

(71) Applicant: Milliken & Company, Spartanburg, SC (US)

(72) Inventors: Heather J. Hayes, Chesnee, SC (US); Yunzhang Wang, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 33 days.

(21) Appl. No.: 16/150,575

(22) Filed: Oct. 3, 2018

(65) Prior Publication Data

US 2019/0105885 A1 Apr. 11, 2019

Related U.S. Application Data

(60) Provisional application No. 62/569,567, filed on Oct. 8, 2017.

(51) Int. Cl.
*B32B 27/34* (2006.01)
*B32B 7/12* (2006.01)
(Continued)

(52) U.S. Cl.
CPC .............. *B32B 27/34* (2013.01); *B32B 5/024* (2013.01); *B32B 5/026* (2013.01); *B32B 5/028* (2013.01);
(Continued)

(58) Field of Classification Search
CPC ....... B32B 15/085; B32B 27/32; B32B 27/34; B32B 7/12; B32B 15/08; B32B 27/08;
(Continued)

(56) References Cited

U.S. PATENT DOCUMENTS 7,294,383 B2 11/2007 Callaway et al. .............. 428/86
7,294,394 B2 11/2007 Eleazer et al. ................. 428/86
(Continued)

FOREIGN PATENT DOCUMENTS

CN         107614582 A  *  1/2018  .............. C08J 9/149
WO     WO 2004/033196        4/2004
WO     WO 2014/182514       11/2014

OTHER PUBLICATIONS

KEVLAR Wikipedia, pp. 1-3. (Year: 2020).*
(Continued)

*Primary Examiner* — Vasudevan S Jagannathan
*Assistant Examiner* — Preeti Kumar
(74) *Attorney, Agent, or Firm* — Cheryl Brickey

(57) ABSTRACT

A fire resistant composite containing an inner core having an upper surface and a lower surface and a plurality of fabric layers. Each fabric layer contains a plurality of interwoven tape elements with a base layer of a strain oriented thermoplastic polymer disposed between covering layers of a heat fusible polymer. The fire resistant composite contains a first flame stable thermally conductive layer on the upper surface of the inner core having a high flame stability and a thermal conductivity of at least about 10 W/m-K at 25° C. and a second flame stable thermally conductive layer on the lower surface of the inner core having a high flame stability and a thermal conductivity of at least about 10 W/m-K at 25° C. The fire resistant composite further contains a first fire resistant polymer layer on the first flame stable thermally conductive layer on the side opposite to the inner core.

19 Claims, 1 Drawing Sheet

(51) Int. Cl.
*B32B 15/08* (2006.01)
*B32B 27/08* (2006.01)
*B32B 5/02* (2006.01)
*B32B 27/06* (2006.01)
*B32B 15/04* (2006.01)
*B32B 15/14* (2006.01)
*B32B 27/20* (2006.01)
*B32B 27/12* (2006.01)
*B32B 15/088* (2006.01)
*B32B 15/085* (2006.01)
*B32B 15/20* (2006.01)
*B32B 27/32* (2006.01)

(52) U.S. Cl.
CPC .............. *B32B 7/12* (2013.01); *B32B 15/04* (2013.01); *B32B 15/08* (2013.01); *B32B 15/085* (2013.01); *B32B 15/088* (2013.01); *B32B 15/14* (2013.01); *B32B 15/20* (2013.01); *B32B 27/06* (2013.01); *B32B 27/08* (2013.01); *B32B 27/12* (2013.01); *B32B 27/205* (2013.01); *B32B 27/32* (2013.01); *B32B 2262/0253* (2013.01); *B32B 2307/202* (2013.01); *B32B 2307/302* (2013.01); *B32B 2307/3065* (2013.01); *B32B 2307/51* (2013.01); *B32B 2307/54* (2013.01); *B32B 2323/04* (2013.01); *B32B 2323/10* (2013.01); *B32B 2367/00* (2013.01); *B32B 2377/00* (2013.01); *B32B 2437/00* (2013.01); *B32B 2437/02* (2013.01); *B32B 2437/04* (2013.01); *B32B 2571/00* (2013.01)

(58) Field of Classification Search
CPC ......... B32B 5/026; B32B 27/06; B32B 15/04; B32B 15/14; B32B 27/205; B32B 5/024; B32B 27/12; B32B 15/088; B32B 5/028; B32B 15/20; B32B 2262/0253; B32B 2307/54; B32B 2437/02; B32B 2437/04; B32B 2571/00; B32B 2307/302; B32B 2307/51; B32B 2307/202; B32B 2307/3065; B32B 2323/04; B32B 2323/10; B32B 2367/00; B32B 2377/00; B32B 2437/00

See application file for complete search history.

(56) References Cited

U.S. PATENT DOCUMENTS

| | | | |
|---|---|---|---|
| 7,300,691 B2 | 11/2007 | Callaway et al. | 428/86 |
| 7,378,359 B2 | 5/2008 | Eleazer | 442/4 |
| 7,892,379 B2 | 2/2011 | Eleazer et al. | 156/182 |
| 8,029,633 B2 | 10/2011 | Nair et al. | 156/167 |
| 8,156,676 B1 | 4/2012 | Terrell | |
| 8,293,353 B2 | 10/2012 | Eleazer et al. | 428/119 |
| 9,643,382 B2 | 5/2017 | Eleazer | |
| 2008/0044659 A1* | 2/2008 | Pilpel | F41H 5/0442 428/411.1 |
| 2009/0227163 A1* | 9/2009 | Perry | B32B 37/24 442/65 |
| 2010/0249255 A1* | 9/2010 | Jacobs | B29C 44/10 521/50.5 |
| 2011/0094826 A1* | 4/2011 | Richardson, III | B32B 5/028 181/294 |
| 2011/0262704 A1 | 10/2011 | Rock et al. | |
| 2014/0356574 A1 | 12/2014 | Conolly et al. | |
| 2014/0360344 A1* | 12/2014 | Pilpel | B32B 27/12 89/36.02 |

OTHER PUBLICATIONS

CN107614582A Google Patents Translation (Year: 2016).*
Patent Cooperation Treaty PCT International Search Report. dated Jan. 2, 2019. International Application No. PCT/US2018/054429. International Filing Date: Oct. 4, 2018.

* cited by examiner

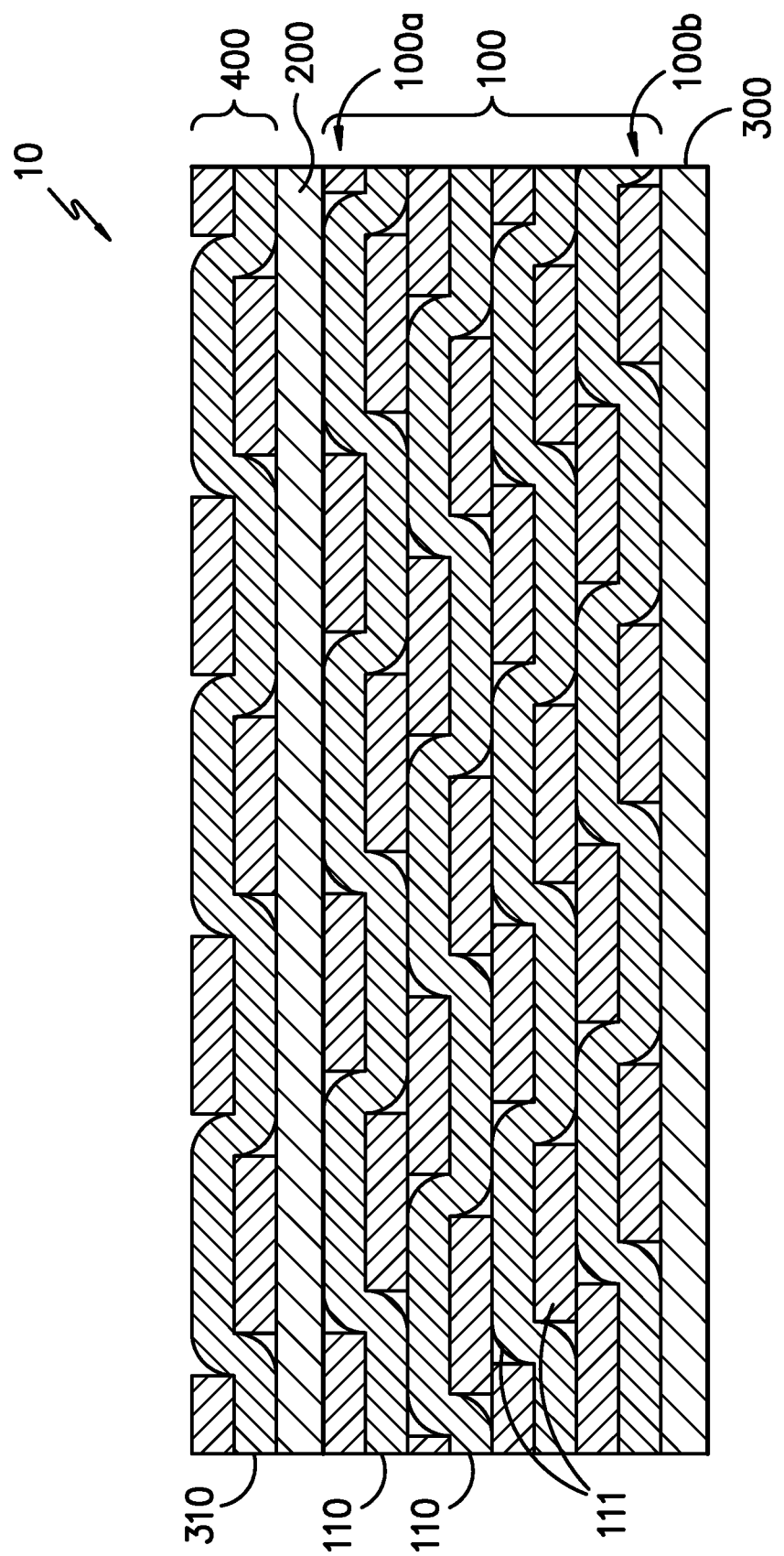

FIRE RESISTANT COMPOSITE

RELATED APPLICATIONS

This application claims priority to U.S. provisional patent application 62/569,567 filed on Oct. 8, 2017.

TECHNICAL FIELD

The present invention relates generally to fire resistant composites, more particularly to fire resistant composite containing fabric layers and thermally conductive and flame stable layers.

BACKGROUND

Composite panels and parts have found good use in many areas where lightweight and stiffness properties are valued. Often times, a level of flame resistance is also desired for safety or structural reasons. A common approach is to introduce flame resistance through the matrix material used in the composite, but for self-reinforced thermoplastic composite materials this can be a more difficult proposition because the flame retardant material can interfere with the ability of the composite to self-adhere or can compromise the strength properties of the composite. Alternative approaches involve the use of outer, protective layers including coatings with flame resistant properties. The surface properties of the composite are often compromised with this approach affecting the durability or aesthetic properties of the composite. In addition, a flame applied to the cut edge of the material will typically result in flaming drips as the self-reinforced thermoplastic melts away from the protective outer layers at the edge during a vertical burn test. Thus, there remains a need for panels and parts that provide stiffness and fire resistance without compromising the surface properties of the material.

BRIEF SUMMARY

A fire resistant composite containing an inner core having an upper surface and a lower surface and a plurality of fabric layers. Each fabric layer contains a plurality of interwoven tape elements with a base layer of a strain oriented thermoplastic polymer disposed between covering layers of a heat fusible polymer. The fire resistant composite contains a first flame stable thermally conductive layer on the upper surface of the inner core having a high flame stability and a thermal conductivity of at least about 10 W/m-K at 25° C. The inner core and first flame stable thermally conductive layer are adhered together by a first binding tie layer. The fire resistant composite contains a second flame stable thermally conductive layer on the lower surface of the inner core having a high flame stability and a thermal conductivity of at least about 10 W/m-K at 25° C. The inner core and second flame stable thermally conductive layer are adhered together by a second binding tie layer. The fire resistant composite further contains a first fire resistant polymer layer on the first flame stable thermally conductive layer on the side opposite to the inner core. The first fire resistant polymer layer and first flame stable thermally conductive layer are adhered together by an optional third binding tie layer.

BRIEF DESCRIPTION OF THE DRAWINGS

The present invention is best understood with reference to the following detailed description of embodiments of the invention when read in conjunction with the attached drawings, in which like numerals refer to like elements, and in which:

FIG. 1 is a side, cross-sectional view of a fire resistant composite according to one embodiment of the invention.

DETAILED DESCRIPTION

Referring to FIG. 1, there is shown a cross-sectional view of one embodiment of the fire resistant composite 10. The fire resistant composite 10 contains an inner core 100 which contains a plurality of fabric layers 110. The inner core 100 has an upper surface 100a and a lower surface 100b. Each fabric layer 110 contains a plurality of interwoven tape elements 111 with a base layer of a strain oriented thermoplastic polymer disposed between covering layers of a heat fusible polymer.

Located on the upper surface 100a of the inner core 100 is a first flame stable thermally conductive layer 200. The first flame stable thermally conductive layer 200 has a high flame stability and a thermal conductivity of at least about 10 W/m-K at 25° C. The inner core 100 and the first flame stable thermally conductive layer 200 are adhered together by a first binding tie layer (not shown).

Located on the lower surface 100b of the inner core 100 is a second flame stable thermally conductive layer 300. The second flame stable thermally conductive layer 300 has a high flame stability and a thermal conductivity of at least about 10 W/m-K at 25° C. The inner core 100 and the second flame stable thermally conductive layer 300 are adhered together by a second binding tie layer (not shown).

The fire resistant composite 10 further contains a first fire resistant polymer layer 400 on the first flame stable thermally conductive layer 200 on the side opposite to the inner core 100. The first fire resistant polymer layer 400 and first flame stable thermally conductive layer 200 are adhered together by an optional third binding tie layer (not shown).

In FIG. 1, the inner core 100 is shown containing four (4) fabric layers 110, but the inner core 100 may have any suitable number of fabric layers, one to ten and beyond. In one embodiment, the inner core 100 contains at least 1 fabric layer. In another embodiment, the inner core 100 contains at least 2 fabric layers. In another embodiment, the inner core 100 of the composite 10 contains at least 3 fabric layers. In another embodiment, the inner core 100 contains at least 5 fabric layers. In another embodiment, the inner core 100 contains at least 8 fabric layers. In another embodiment, the inner core 100 contains between 3 and 8 fabric layers.

In one embodiment, the fabric layers 110 are a woven fabric layer, for example, plain, satin, twill, basket-weave, poplin, jacquard, and crepe weave fabric layers. Preferably, the woven fabric layer is a plain weave fabric layer.

In another embodiment, the fabric layer is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the fabric layer 110 is a multi-axial, such as a tri-axial fabric (knit, woven, or non-woven). In another embodiment, the fabric layer 110 is a bias fabric. In another embodiment, the fabric layer 110 is a non-woven. The term non-woven refers to structures incorporating a mass of yarns that are entangled and/or heat fused so as to provide a coordinated structure with a degree of internal coherency. Non-woven fabrics for use as the fabric layer 110 may be formed from many processes such as for example, meltspun processes, hydroentangeling processes, mechanically entangled processes, stitch-bonded and the like. In another embodiment, the fabric layer 110 is a unidirectional and may have overlapping fibers or may have gaps between the fibers.

Each of the fabric layers 110 contains a plurality of interwoven tape elements 111 with a base layer of a strain oriented olefin polymer which adheres to neighboring fabric layers under heat and pressure. These tape elements may also be sometimes referred to as ribbons, strips, tapes, tape fibers, and the like. Preferably the fabric layers 110 are woven fabrics with tape elements 111 in a warp direction and tape elements 111 in a weft direction which is approximately perpendicular to the warp direction. Preferably, the woven fabric layers 100 have a thickness of between about 0.05 mm and 0.35 mm, more preferably between about 0.10 mm and 0.20 mm once consolidated.

The tape elements 111 preferably comprise a base layer of a strain oriented olefin polymer which adheres to neighboring fabric layers under heat and pressure. The tape elements 111 within the woven fabric layer 110 are interwoven and crossover each other at crossover points and once heat is supplied, the tape elements 111 are bonded to other tape elements 111 at crossover points and the outer surface of the member. The term "bonded" means held together, adhered, or attached and may also be referred to as fused. This bonding or fusing may be accomplished by using heat to partially melt and bond the elements together or by using an additional adhesive that may be heat, light, or monomer initiator, or UV activated.

Preferably, the tape elements 111 are monofilament fibers having a rectangular cross-section and are continuous. The tape element 111 is considered to have a rectangular cross-section even if one or more of the corners of the rectangular are slightly rounded or if the opposing sides are not perfectly parallel. Having a rectangular cross-section may be preferred for a variety of reasons. Firstly, the surface available for bonding is greater. Secondly, during a de-bonding event the whole width of the tape is under tension and shear points are significantly reduced or eliminated.

In one embodiment, the tape elements 111 have a cross-sectional shape with a width between about 0.05 mm and 10 mm more preferably between about 0.1 mm and 5 mm and a thickness between about 10 μm and 500 μm more preferably between about 20 μm and 200 μm. In one embodiment, the aspect ratio comparing the width of the rectangular cross-section to the thickness of the rectangular cross-section is between about 5 and 500.

The tape elements 111 may be formed from any suitable material. Preferably, the tape elements comprise a thermoplastic polymer. Some suitable materials include, but are not limited to, polypropylenes, polyethylenes, polyesters, polyamides, polyethers, copolymers of any of the above; glass, aramid, carbon, ceramic, nylon, polyetherimide, polyamide-imide, polyphenylene sulfide, polysulfones, polyimide, conjugated polymers, mineral fiber, natural fibers, metallic fiber or mixtures thereof. In one embodiment, the tape elements 50 have a tensile modulus of greater than 10 grams per denier as measured by ASTM method 3811-07 and/or a tensile strength of at least 100 MPa. In one embodiment, the tape elements comprise polypropylene. Polypropylene may be preferred for some applications due to its strength, ability to be oriented, and low cost. In another embodiment, the tape elements comprise polyethylene (including a co-polymer of polyethylene). Polyethylene is also preferred for some applications due to its strength, ability to be oriented, and low cost.

In one embodiment, the tape elements 111 contain a base layer of a strain oriented olefin polymer which adheres to neighboring fabric layers under heat and pressure. Alternatively, it is contemplated that only a single covering layer may be present. The base layer of the tape elements is preferably compatibly bonded to each of covering layers between their contiguous surfaces. It is further contemplated that the covering layers have a softening temperature, or melting temperature, lower than that of the base layer. The base layer may be, but is not limited to, a polyolefin polymer such as polypropylene, polyethylene, a polyester such as polyethylene terephthalate, or a polyamide such as Nylon 6 or Nylon 6-6. According to one potentially preferred practice, the base layer may be polypropylene or polyethylene. The base layer may account for about 50-99 wt. % of the tape element, while the covering layers account for about 1-50 wt. % of the tape element. Preferably, the base and covering layers are made up of the same class of materials to provide an advantage with regard to recycling and adhesion.

In an embodiment where the base layer contains polypropylene, the material of covering layers is preferably a copolymer of propylene and ethylene or an α-olefin and has a lower melting temperature than the base layer. One example of a suitable tape element is TEGRIS® available from Milliken & Company.

The tape elements 111 may be produced in any suitable manner. In one embodiment, the tape elements 111 may be formed by slitting a film. The film may be formed by any conventional means of extruding such multilayer polymeric films. By way of example, and not limitation, the film may be formed by blown film or cast film extrusion. The film is then cut into a multiplicity of longitudinal strips of a desired width by slitting the film to yield tape elements having the desired cross-sections. The tape elements 111 may then be drawn in order to increase the orientation of the tape element so as to provide increased strength and stiffness of the material. In another embodiment, an already oriented (mono or bi axially) film is then slit into tape elements.

In another embodiment, the tape elements 111 are extruded from a slit die then oriented. The process begins with slit extruding molten polymer to form fibers having a rectangular cross-section. The die typically contains between 5 and 60 slits, each one forming a fiber. In one embodiment, the each slit die has a width of between about 15 mm and 50 mm and a thickness of between about 0.6 and 2.5 mm. The fibers once extruded are typically 4 to 12 mm wide and after drawing are typically 1 to 3 mm wide. The fibers may be extruded having one layer or may have a second layer and/or a third layer using co-extrusion.

In one embodiment, the tape elements 111 preferably have a draw ratio of at least about 5, a modulus of at least about 2 GPa, and a density of at most about 0.95 g/cm$^3$. In another embodiment, the tape element has a draw ratio of at least about 6. In another embodiment, the tape element has a modulus of at least about 3 GPa or at least about 4 GPa. In another embodiment, the tape element has a density of at most about 0.85 g/cm$^3$.

The fabric layers 110 may be any suitable fabric layer. This includes but is not limited to a woven but may also be a nonwoven, unidirectional, or knit fabric layer. In one embodiment, the weft tape elements 111 and the warp tape elements 111 are formed into a so called plain weave wherein each weft tape element passes over a warp tape element and thereafter passes under the adjacent warp tape element in a repeating manner across the full width of the woven layer. However, it is also contemplated that any number of other weave constructions as will be well known to those of skill in the art may likewise be utilized. By way of example only, and not limitation, it is contemplated that the weft tape elements may pass over two or more adjacent warp tape elements before transferring to a position below one or more adjacent warp fibers thereby forming a twill weave. The term "interwoven" is meant to include any construction incorporating inter-engaging formation fibers. In one embodiment, the woven layers are, for example, plain, satin, twill, basket-weave, poplin, jacquard, and crepe weave woven layers. Preferably, the woven layers are either a plain or twill weave woven layer. It has been shown that plain weaves have good abrasion and wear characteristics. A twill weave has been shown to have good aesthetic properties.

The inner core 100 may contain additional layers and additional fabric layers. The additional layers may be any suitable layer, fibrous or not. In one embodiment, the additional layers are FR layers, metallic layers, or adhesive layers. The additional fabric layers may contain tape elements 111 in a different construction than the fabric layers 110 or may contain different fibers/yarns in the same or different construction than the fabric layers 110. In one embodiment, the inner core contains additional flame stable, conductive layers.

In another embodiment, the fabric layers 110 contain fibers and/or yarns that have a different composition, size, and/or shape to the tape elements 111 (in place of or in addition to the tape elements 111). "Fiber" used herein is defined as an elongated body. The fiber may have any suitable cross-section such as circular, multi-lobal, square or rectangular (tape), and oval. These additional fibers may include, but are not limited to: polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof. These additional fibers/yarns may be used, for example, in the warp direction of the fabric layer 110, with the tape elements 111 being used in the weft direction.

Referring back to FIG. 1, the composite 10 also contains a first flame stable thermally conductive layer 200 (referred to herein as the first conductive layer). The first conductive layer 200 is located on the upper surface 100a of the inner core 100. The first conductive layer 200 has a high flame stability and a thickness of preferably between about 1 micron and 500 microns. The first conductive layer 200 has a thermal conductivity of at least about 10 W/m-K at 25° C., more preferably at least about 50 W/m-K at 25° C., more preferably at least about 100 W/m-K at 25° C. In one preferred embodiment, the first flame stable thermally conductive layer comprises a continuous metal foil, preferably aluminum foil.

In order to support a burn, there are three required components—fuel, oxygen, and heat. Limiting any one of those can be an effective way to introduce flame retardancy to a composite material. Because most thermoplastics have an abundance of fuel by their nature, restricting both oxygen and heat is an effective and efficient way to restrict the composite from burning.

Use of a flame stable material which is impermeable to molten polymer near the surface of the composite isolates the bulk of the composite from exposure to burning. If the flame stable material delaminates or otherwise breaks down during the initial flame exposure, the barrier becomes less or even in-effective. A flame stable material is defined as one which does not substantially change shape when exposed to the flame test. The barrier must slow the permeation of molten polymer sufficiently to starve the flame allowing it to self-extinguish. The flame stable material will also prevent oxygen from readily passing through it.

Use of a thermally conductive layer in the composite draws heat away from the flame cooling the burn to allow the material to self-extinguish. The greater the thermal conductivity the faster and more effective the cooling effect can be. The mass of the conductive layer can be an important factor favoring a thicker conductor over a thin conductor to achieve the best flame retardancy. The conductive layer must be thick enough to assist in flame retardancy without adding too much additional weight.

Both the flame stable layer and the thermally conductive layer must be resistant to flame in order to be effective in this use. The same material can be used to achieve both properties or a layered system could be used. Metal films such as aluminum, steel, copper, or titanium foils have been found to be effective for this purpose. In one preferred embodiment, the layer thickness is between about 1 and 500 micrometers. More preferably, it is between 10 and 100 micrometers.

The inner core 100 and the first flame stable thermally conductive layer 200 are adhered together by a first binding tie layer. The first binding tie layer adheres the inner core 100 and the first conductive layer 200 together. The first binding tie layer may melt, conform, penetrate the other layers, or otherwise change shape during the application of the adhesive. The first binding tie layer preferably comprises a material which is compatible with the adjacent layers 100, 200 and fuses the layers together. The adhesive may be activated by pressure, heat, UV, other activation methods, or any combination thereof. In one embodiment, the first binding tie layer is a pressure sensitive adhesive. In another embodiment, the first binding tie layer is a low melt adhesive. In another preferred embodiment, the first binding layer is a co-extruded film. Preferably, the co-extruded film comprises a first sub-layer able to adhere to polyolefins and a second sub-layer able to adhere to metallics.

In this embodiment, one side of the co-extruded film adheres well to the inner core 100 and the other side adheres well to the first flame stable thermally conductive layer.

The first binding tie layer may be formed by any method known in the art. The first binding tie layer may be applied to the inner core and/or the first conductive layer or may be formed as a stand-alone layer that is then applied to the inner core or first conductive layer. Preferred methods include any well-known coating method such as air knife coating, gravure coating, hopper coating, roller coating, spray coating, gravure printing, inkjet printing, thermal transfer, and the like. The first binding tie layer may be a continuous or discontinuous layer, having a pattern or being random. The coating composition can be based on water or organic solvent(s) or a mixture of water and organic solvent(s). Alternatively, the first binding tie layer can be formed by thermal processing such as extrusion and co-extrusion with and without stretching, blow molding, injection molding, lamination, etc. The first binding tie layer may also be an adhesive film, web, scrim, powder coating, or the like.

Referring back to FIG. 1, the composite 10 also contains a second flame stable thermally conductive layer 300 (referred to herein as the second conductive layer). The second conductive layer 300 is located on the lower surface 100b of the inner core 100. The second conductive layer preferably has the same preferred air permeability and thermal conductivity ranges as the first conductive layer 200. The second conductive layer may have the same materials and physical parameters as described for the first conductive layer 200. In one embodiment, the second conductive layer is the same as the first conductive layer. In another embodiment, the second conductive layer contains a different material than the first conductive layer. In another embodiment, the second conductive layer contains the same material as the first conductive layer, but has different physical properties (such as thickness of the layer) such that the air permeability and/or thermal conductivity are different.

The inner core 100 and the second flame stable thermally conductive layer 200 are adhered together by a second binding tie layer. The second binding tie layer adheres the inner core 100 and the second conductive layer 300 together. The second binding tie layer preferably fits into the description the first binding tie layer described above (including all descriptions of materials, characteristics, and processes).

The composite also contains a first fire resistant (FR) polymer layer 400. Preferably, the first FR polymer layer forms one of the outer surfaces of the fire resistant composite 10. The FR polymer layer 400 may be any suitable layer having adequate FR properties. In one embodiment, the FR polymer layer 400 comprises a FR thermoplastic film. This film may have a smooth surface texture or may have a roughened or patterned texture. The film may be extruded, coated, blow-molded, or formed in any other suitable process. In another embodiment, the FR polymer layer 400 may contain fabric layer 310 as described in the fabric layers of the inner core section. In one preferred embodiment, the first fire resistant polymer layer comprises a fabric layer comprising a plurality of interwoven tape elements comprising a base layer of a strain oriented olefin polymer which adheres to neighboring fabric layers under heat and pressure. The FR polymer layer 400 may be inherently FR due to the materials that make up the layer or the layer may be treated with FR chemistries to render the layer FR. For example, for the embodiment where the FR polymer layer contains woven tape elements, the tape elements may contain FR properties on their own (such as a polyimide), may contain FR chemistries within the tape elements, or the woven fabric may be treated with FR chemistries. In one preferred embodiment, the FR polymer layer comprises a polypropylene film with FR additives combined with a single fabric layer.

The first conductive layer 200 and the first fire resistant polymer layer 400 are preferably adhered together by an optional third binding layer. There may be some embodiments where the first conductive layer 200 and the first FR polymer layer 400 do not need an additional binding layer to hold them together. The third binding tie layer preferably fits into the description the first binding tie layer described above (including all descriptions of materials, characteristics, and processes).

In one embodiment, the composite 10 further contains a second FR polymer layer which is attached to the second conductive layer 300 with an optional fourth binding layer. The fourth binding tie layer preferably fits into the description the first binding tie layer described above (including all descriptions of materials, characteristics, and processes). The second FR polymer layer preferably fits into the description the first FR polymer layer described above (including all descriptions of materials, characteristics, and processes).

The fire resistant composite 10 may be used for any suitable end use. Preferably, the fire-resistant composite 10 may be used as part of a garment such as a belt, jacket, vest, helmet, hat, or shoes. The composite 10 preferably has a stiffness of 1 to 150 N-m, so the composite may best be used in parts of a garment that need some level of stiffness such as a belt.

Test Methods

Examples were tested using the ASTM D6413 Standard Test Method for Flame Resistance of Textiles (Vertical Test)

EXAMPLES

Example 1

An 8 ply sample of silver, plain woven 2.2 mm wide self-reinforcing polypropylene tape of 11 ends and picks per inch was consolidated at 500 psi and 310° F.

Example 2

A 1 mil thick aluminum foil sandwiched 8 plies of silver, plain woven 2.2 mm wide self-reinforcing polypropylene tape of 11 ends and picks per inch. A coextruded polyamide/polypropylene tie layer film was used to adhere the foil to the polypropylene layers. The layup was consolidated at 500 psi and 310° F.

Example 3

Eight plies of silver, plain woven 2.2 mm wide self-reinforcing polypropylene tape of 11 ends and picks per inch (fabric), two layers of 600 denier Kevlar KM2+ of 28 ends and picks per inch (aramid fabric), and two layers of 5 mil thick colored polypropylene film with a 25% loading of an FR additive (25% FR film) were laid up as follows—1 layer 25% FR film, 1 ply aramid fabric, 8 plies fabric, 1 ply aramid fabric, 1 layer 25% FR film. A coextruded polyamide/polypropylene tie layer film was used to adhere the aramid fabric to the polypropylene layers. The layup was consolidated at 500 psi and 310° F.

Example 4

Eight plies of silver, plain woven 2.2 mm wide self-reinforcing polypropylene tape of 11 ends and picks per inch (fabric), two layers of 25 micron thick polyimide film (PI film), and two layers of 125 micron thick colored polypropylene film with a 15% loading of an FR additive (15% FR film) were laid up as follows—1 layer 15% FR film, 1 layer PI film, 8 plies fabric, 1 layer PI film, 1 layer 25% FR film. A coextruded polyamide/polypropylene tie layer film was used to adhere the polyimide film to the polypropylene layers. The layup was consolidated at 500 psi and 310° F.

Example 5

Eight plies of silver, plain woven 2.2 mm wide self-reinforcing polypropylene tape of 11 ends and picks per inch (fabric), two layers of 25 micron thick aluminum foil (Al foil), and two layers of 125 micron thick colored polypropylene film with a 15% loading of an FR additive (15% FR film) were laid up as follows—1 layer 15% FR film, 1 layer Al foil, 8 plies fabric, 1 layer Al foil, 1 layer 25% FR film. A coextruded polyamide/polypropylene tie layer film was used to adhere the aluminum foil to the polypropylene layers. The layup was consolidated at 500 psi and 310° F.

Example 6

Eight plies of silver, plain woven 2.2 mm wide self-reinforcing polypropylene tape of 11 ends and picks per inch (fabric), two layers of 125 micron thick colored polypropylene film with a 15% loading of an FR additive (15% FR film), and two layers of 25 micron thick aluminum foil (foil) were laid up as follows—1 layer 15% FR film, 1 ply fabric, 1 layer foil, 6 plies fabric, 1 layer foil, 1 ply fabric, 1 layer 15% FR film. A coextruded polyamide/polypropylene tie layer film was used to adhere the foil to the polypropylene layers. The layup was consolidated at 500 psi and 310° F.

Example 7

Eight plies of silver, plain woven 2.2 mm wide self-reinforcing polypropylene tape of 11 ends and picks per inch (fabric), two layers of 125 micron thick colored polypropylene film with a 15% loading of an FR additive (15% FR film), and two layers of 12 micron thick metallized film with ~0.05 micron aluminum (metallized film) were laid up as follows—1 layer 15% FR film, 1 ply fabric, 1 layer metallized film, 6 plies fabric, 1 layer metallized film, 1 ply fabric, 1 layer 15% FR film. The layup was consolidated at 500 psi and 310° F.

TABLE 1

Properties of Individual Materials Used in Examples

| Material | Thermal Conductivity (W/m-K) @ 25 C. | Flame Stability of Material | Flame Properties in ASTM D6413 |
| --- | --- | --- | --- |
| Consolidated PP fabric | 0.1 | Poor | Melts and burns |
| 25% FR Film | 0.1 | Poor | Melts but self-extinguishes |
| 15% FR Film | 0.1 | Poor | Melts but self-extinguishes |
| Aluminum Foil | 200 | Excellent | No burn, no melt |
| PI Film | 0.2 | Moderate | No burn, slight warping with heat |
| Aramid Fabric | N/A | Moderate | No burn, no melt |
| Metallized Film | 0.6 | Poor | Melts and burns |

TABLE 2

Results of ASTM D6413 Testing of Examples

| Example | ASTM D 6413 Result | Observations |
| --- | --- | --- |
| 1 | Fail | Burn with flaming drips |
| 2 | Pass | Self-extinguished, no afterflame |
| 3 | Fail | Afterflame >>5 sec |
| 4 | Fail | Afterflame >>5 sec |
| 5 | Pass | Self-extinguished, no afterflame |
| 6 | Pass | Self-extinguished, afterflame <1 sec |
| 7 | Fail | Burn with flaming drips |

Examples 2, 5 and 6 all passed the flame test due to the presence of the flame stable thermally conductive layers against the inner core material. The addition of the outer flame resistant polymer layers for aesthetic and functional purposes in examples 5 and 6 did not significantly diminish the flame resistant properties of the overall composite. Example 1 contained no flame resistant materials at all and is treated as the control.

Examples 3 and 4 incorporate flame resistant materials which were not sufficiently flame stable and/or thermally conductive. The polyimide film of Example 4 distorted upon flame exposure leading to delamination from the composite and the ability for the flame to directly reach the core material. The aramid fabric of Example 3 allowed the molten polymer to seep through the barrier material and continue to burn.

Example 7 utilized a barrier material which was not flame stable in spite of the fact that it utilized a very thin conductive layer. Both flame stability and thermal conductivity are required to achieve the optimal flame resistance for the composite material.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fire resistant composite having outer surfaces and comprising:
   an inner core having an upper surface and a lower surface and comprising a plurality of fabric layers, wherein each fabric layer comprises a plurality of interwoven tape elements comprising a base layer of a strain oriented olefin polymer which adheres to neighboring fabric layers under heat and pressure;

a first flame stable thermally conductive layer on the upper surface of the inner core, wherein the flame stable thermally conductive layer is impermeable to molten polymer and has a thickness less than about 0.5 mm, wherein the inner core and first flame stable thermally conductive layer are adhered together by a first binding tie layer;

a second flame stable thermally conductive layer on the lower surface of the inner core, wherein the flame stable thermally conductive layer is impermeable to molten polymer and has a thickness less than about 0.5 mm, wherein the inner core and first flame stable thermally conductive layer are adhered together by a second binding tie layer; and, a first fire resistant polymer layer on the first flame stable thermally conductive layer on the side opposite to the inner core, wherein the first fire resistant polymer layer and first flame stable thermally conductive layer are adhered together by an optional third binding tie layer, and wherein the first fire resistant polymer layer forms one of the outer surfaces of the fire resistant composite.

2. The fire resistant composite of claim 1, further comprising a second fire resistant polymer layer on the second flame stable thermally conductive layer on the side opposite to the inner core, wherein the second fire resistant polymer layer and second flame stable thermally conductive layer are adhered together by an optional fourth binding tie layer.

3. The fire resistant composite of claim 1, wherein the first fire resistant polymer layer comprises a fire resistant thermoplastic film.

4. The fire resistant composite of claim 3, wherein the first fire resistant thermoplastic film is a blown fire resistant thermoplastic film.

5. The fire resistant composite of claim 1, wherein the first fire resistant polymer layer comprises a fabric layer comprising a plurality of interwoven tape elements comprising a base layer of a strain oriented olefin polymer which adheres to neighboring fabric layers under heat and pressure.

6. The fire resistant composite of claim 1, wherein the first fire resistant polymer layer comprises a dye or pigment.

7. The fire resistant composite of claim 1, wherein the first fire resistant thermoplastic film comprises polyamide.

8. The fire resistant composite of claim 1, wherein the first binding tie layer is a co-extruded film.

9. The fire resistant composite of claim 8, wherein the co-extruded film comprises a first sub-layer able to adhere to polyolefins and a second sub-layer able to adhere to metallics.

10. The fire resistant composite of claim 1, wherein the first flame stable thermally conductive layer comprises a continuous metal foil.

11. The fire resistant composite of claim 10, wherein the continuous metal foil comprises aluminum.

12. The fire resistant composite of claim 1, wherein the second flame stable thermally conductive layer comprises a continuous metal foil.

13. The fire resistant composite of claim 12, wherein the continuous metal foil comprises aluminum.

14. The fire resistant composite of claim 1, wherein the inner core comprises additional layers.

15. The fire resistant composite of claim 14, wherein the additional layers are selected from the group consisting of metal foil, flame resistant fabric, and metal mesh.

16. The fire resistant composite of claim 14, wherein additional layers are additional flame stable thermally conductive layers.

17. A garment comprising the fire resistant composite of claim 1.

18. The garment of claim 17, wherein the garment is selected from the group consisting of a belt, jacket, vest, helmet, hat, load distribution systems, and shoes.

19. The fire resistant composite of claim 1, wherein the first fire resistant polymer comprises a fabric layer.

* * * * *